(12) United States Patent
Shimanuki (10) Patent No.: US 8,262,012 B2
(45) Date of Patent: Sep. 11, 2012

(54) LEADER BLOCK, REEL HUB, AND REEL USING THE SAME

(75) Inventor: Hiroyuki Shimanuki, Tokyo (JP)

(73) Assignee: NECEmbeddedProducts, Ltd., Tokyo (JP)

( * ) Notice: Subject to any disclaimer, the term of this patent is extended or adjusted under 35 U.S.C. 154(b) by 0 days.

(21) Appl. No.: 12/534,363

(22) Filed: Aug. 3, 2009

(65) Prior Publication Data
US 2010/0032512 A1    Feb. 11, 2010

(30) Foreign Application Priority Data

Aug. 7, 2008 (JP) .................................. 2008-204161

(51) Int. Cl.
B65H 19/28 (2006.01)
(52) U.S. Cl. .................................. 242/532.6; 242/332.8
(58) Field of Classification Search ............... 242/332.4, 242/332.7, 332.8, 532.1, 532.6, 532.7, 532, 242/532.5; 360/95, 132
See application file for complete search history.

(56) References Cited

U.S. PATENT DOCUMENTS

| | | | | |
|---|---|---|---|---|
| 5,443,220 A | * | 8/1995 | Hoge et al. ................. | 242/332.8 |
| 6,311,916 B1 | * | 11/2001 | Johnson et al. ............ | 242/332.8 |
| 7,063,286 B2 | * | 6/2006 | Masuda ...................... | 242/332.4 |
| 7,195,190 B2 | * | 3/2007 | Tsuneyoshi et al. ....... | 242/332.4 |
| 7,367,521 B2 | * | 5/2008 | Shimanuki ................. | 242/332.4 |
| 7,500,633 B1 | * | 3/2009 | Rudi et al. ................. | 242/532.6 |

FOREIGN PATENT DOCUMENTS

| | | |
|---|---|---|
| JP | 2001297563 A | 10/2001 |
| JP | 2003132652 A | 5/2003 |
| JP | 2003242748 A | 8/2003 |

OTHER PUBLICATIONS

Japanese Office Action for JP2008-204161 issued Apr. 17, 2012.

* cited by examiner

*Primary Examiner* — William A Rivera (57) ABSTRACT

The cartridge for accommodating the tape can be downsized, a carrying mechanism is not required to be retracted after the leader block and the reel hub are fitted, and the generation of the non-uniform winding can be prevented. A reel formed by combining a leader block and a reel hub to load the leader block, in which the reel hub has a slot formed along a radial direction from a peripheral surface to a shaft center. Further, the leader block is detachably fitted in the slot of the reel hub, the reel includes a hook part which detachably engages with a leader pin attached at a beginning of the tape and protruding parts which are supported by the reel hub when the leader block is loaded in the slot of the reel hub.

1 Claim, 8 Drawing Sheets

LEADER BLOCK, REEL HUB, AND REEL USING THE SAME

CROSS-REFERENCE TO RELATED APPLICATION

This application is based upon and claims the benefit of priority from Japanese patent application No. 2008-204161, filed on Aug. 7, 2008, the disclosure of which is incorporated herein in its entirety by reference.

BACKGROUND OF THE INVENTION

1. Field of the Invention

The present invention relates to a reel hub for winding a tape, and particularly, to a leader block for fixing a beginning of the tape to the reel hub, and a reel using the same.

2. Description of the Related Art

Figure 7A:
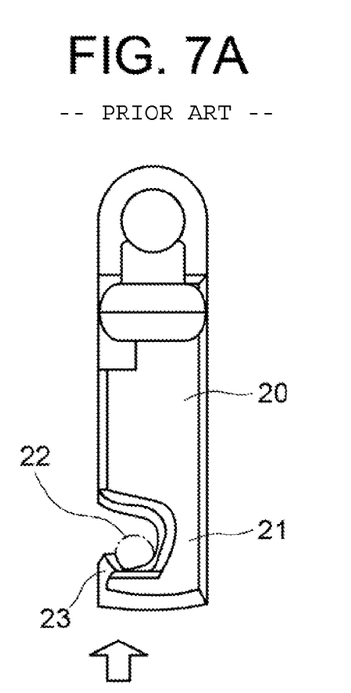
FIG. 7 is an illustration showing a configuration of a leader block according to related art.
Figure 7B:
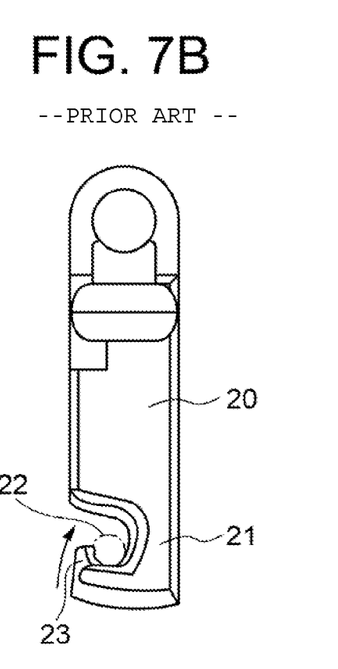
Figure 8:
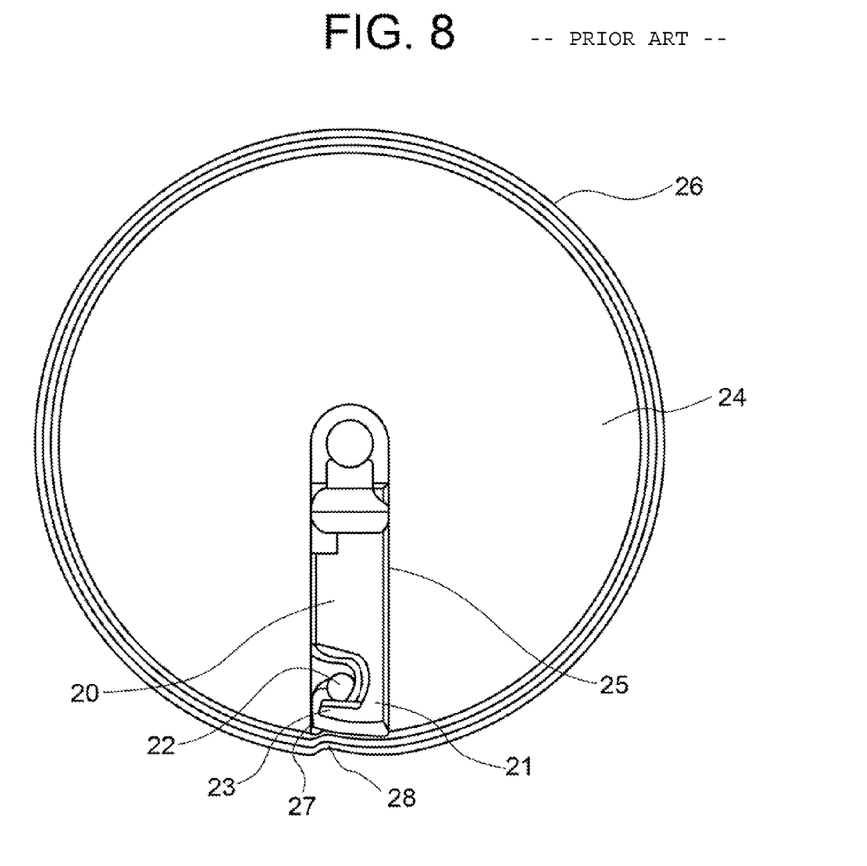
FIG. 8 is an illustration showing a state when a non-uniform winding is generated at a position of a level difference between the leader block and the reel hub due to the deformation of the leader block.

As a method of fixing a beginning of a tape to a reel, there is a method with which a leader pin 22 provided at a beginning of a tape 26 is engaged to a hook part 21 of a leader block 20 as shown in FIGS. 7A and 7B, and the leader block 20 is inserted into a slot 25 formed in a reel hub 24 as shown in FIG. 8. With this method, the leader block 20 forms a part of a barrel of the reel.

A magnetic tape recording device has been improved to realize an increase in recording density, an extension of the length of the tape, and an increase in running velocity of the tape, for the purpose of implementation of higher-capacity recording and high-speed reading/writing. If those features described above are achieved, the length of the tape can be extended, and the reel can rotate at higher speed. When the extension of the length of the tape is achieved, the diameter of the reel with the total content of the wound tape is intended to be sustained by thinning the thickness of the tape.

When the length of the tape is extended, the number of windings of the tape on the reel increases, and a tape 26 is wound harder on a reel hub 24 of the reel, thus a leader block 20 is pressed in a radial direction of the reel hub 24 by the wound tape 26. One side of a hook part 21 of the leader block 20 is opened to engage with a leader pin 22. As shown in FIGS. 7A and 7B, when the leader block 20 is pressed in the radial direction of the reel hub 24, open side of the hook part 21 is pushed into a slot 25 of the reel hub 24 deeply, and a level difference 27 is generated at a boundary of the leader block 20 and the reel hub 24.

The level difference 27 becomes a cause of a non-uniform winding 28 of the tape particularly when the tape thickness is being thinner, and also, the non-uniform winding 28 of the tape causes a non-uniformity of the tape running velocity. Further, there is a case when the non-uniform winding 28 of the tape due to the level difference 27 attributes to an excessive force to be applied to the tape 26 for damaging a recording surface of the tape 26, and in such a case, causes a reading/writing error of the high-density recorded data. Also, the non-uniform winding 28 of the tape is possible to cause the non-uniformity of the tape running velocity, and the non-uniformity of the tape running velocity can also cause a reading/writing error of the high-density recorded data.

As a technique related to solving the problems described above, a recording tape cartridge is disclosed in Japanese Unexamined Patent Publication 2003-132652 (Patent document 1).

However, different from the system shown in FIGS. 7A and 7B, Patent document 1 discloses a configuration in which the leader block is integrally attached to a beginning of the tape, and when the tape is wound by the reel of the tape cartridge (not shown), the leader block is positioned at an end portion of the tape being wound, and accommodated in the tape cartridge. Therefore, the tape cartridge accommodating the reel around which the tape is wound is required to have a space for accommodating the leader block in addition to a space for accommodating the reel, and it makes it difficult to downsize the tape cartridge.

Also, Patent document 1 discloses a configuration in which a drawing pin is inserted in an operational hole of the leader block which has been pulled out of the tape cartridge, the leader block is carried to a position of a targeted reel hub by pulling the drawing pin, and the leader block is fitted in an intrusive part formed along a circumferential direction of the reel hub. Therefore, the reel cannot be rotated before the drawing pin is pulled out of the operational hole of the leader block, and there is a limit on shortening the time from when the tape is loaded till when the data is written/read.

Further, in Patent document 1, a curved surface formed on a peripheral of the leader block occupies a large portion of a take-up surface of the reel hub on which the tape is wound, so a highly precise processing technique is required when processing the curved surface of the leader block by being positioned to form the same circumference surface as the surface of the reel hub on which the tape is wound. To this processing, a processing accuracy of the intrusive part of the reel hub is also related, and proficiency is required to process the leader block.

SUMMARY OF THE INVENTION

The present invention is achieved in view of such problems, and an exemplary object of the invention is to provide a leader block, a reel hub, and a reel using the same, with which the cartridge for accommodating the tape can be downsized, a carrying mechanism is not required to be retracted after the leader block and the reel hub are fitted, and the generation of a non-uniform winding can be prevented.

In order to achieve the above described object, a reel according to an exemplary aspect of the invention is a reel formed by combining a leader block and a reel hub to load the leader block, in which the reel hub has a slot formed along a radial direction from a peripheral surface to a shaft center, and the leader block is detachably fitted in the slot of the reel hub, the reel including: a hook part which detachably engages with a leader pin attached at a beginning of the tape; and protruding parts which are supported by the reel hub when the leader block is loaded in the slot of the reel hub.

In the example described above, the present invention is configured as the reel, but this invention is not limited to such case. The present invention may be configured as the leader block or the reel hub used for the reel.

When the present invention is configured as a leader block to be combined with a reel hub of a reel, a leader block according to another exemplary aspect of the invention is a leader block which configures the reel by combined with the reel hub for winding the tape, the leader block being detachably fitted in the slot formed along a radial direction from a peripheral surface to a shaft center of the reel hub, the leader block including: a hook part which detachably engages with a leader pin attached to a beginning of the tape; and protruding parts which are supported by the reel hub when the leader block is loaded in the slot of the reel hub.

When the present invention is configured as a reel hub to be combined with a leader block of a reel, a reel hub according to still another exemplary aspect of the invention is a reel hub which configures the reel by combined with the leader block attached to a beginning of the tape, and has a take-up surface around which the tape is wound formed on a peripheral surface, including: a slot formed along a radial direction from the peripheral surface to a shaft center for detachably fitting with the leader block; and notches, formed on an opening edge of the slot, to which protruding parts formed on the leader block are fitted.

DETAILED DESCRIPTION OF THE EXEMPLARY EMBODIMENTS

Here, a preferred embodiment of the invention will be described.

Figure 1A:
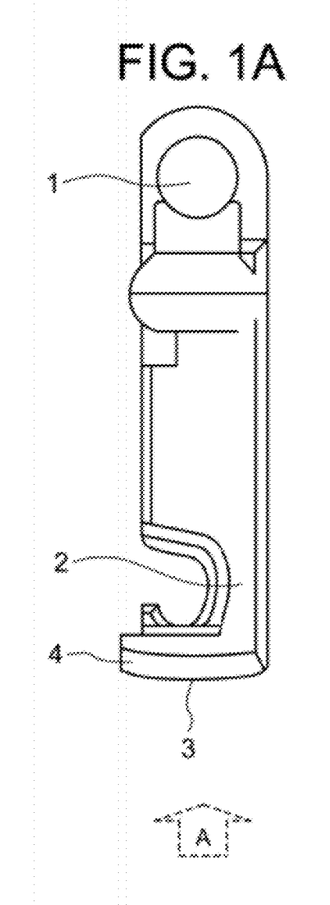
FIG. 1 is an illustration showing a configuration of a leader block according to an exemplary embodiment of the invention.
Figure 1B:
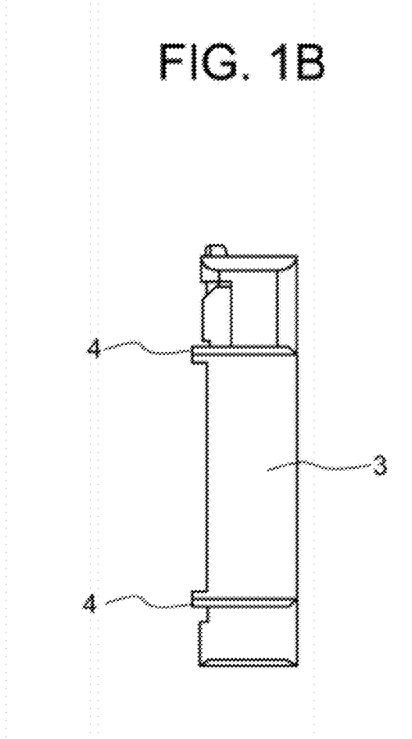
Figure 2A:
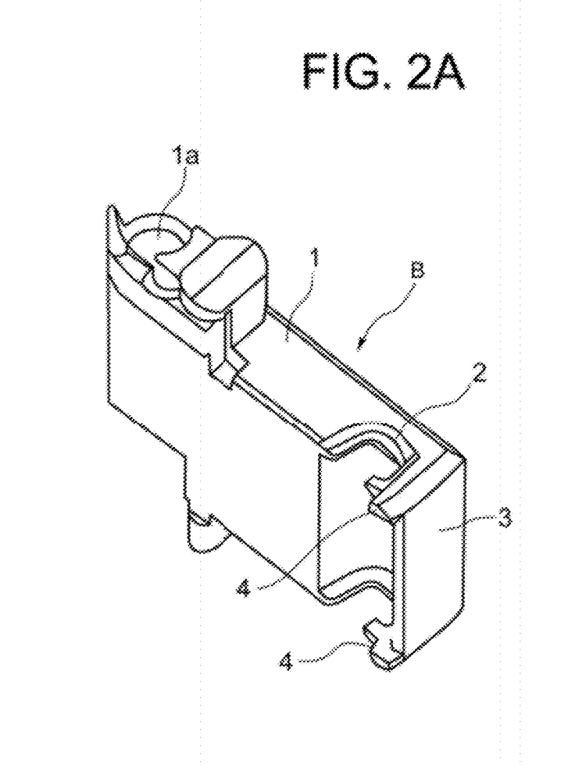
FIG. 2 is an illustration showing a configuration of a leader block according to an exemplary embodiment of the invention.
Figure 2B:
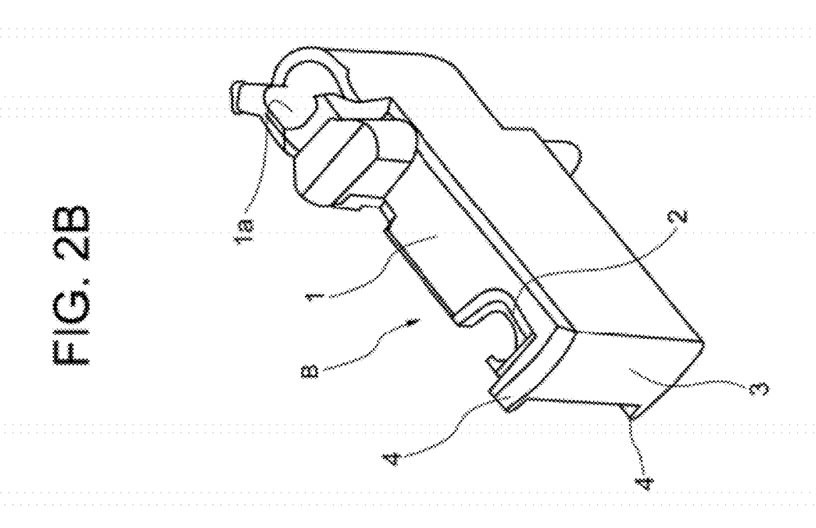

A configuration of the leader block according to the exemplary embodiment is shown in FIGS. 1A, 1B and FIG. 2. Note that FIG. 1A shows a state viewed from an axial direction of a reel hub which is the target to be loaded, and FIG. 1B shows a state viewed from a radial direction of the reel hub (pointing direction of an arrow A).

Figure 3:
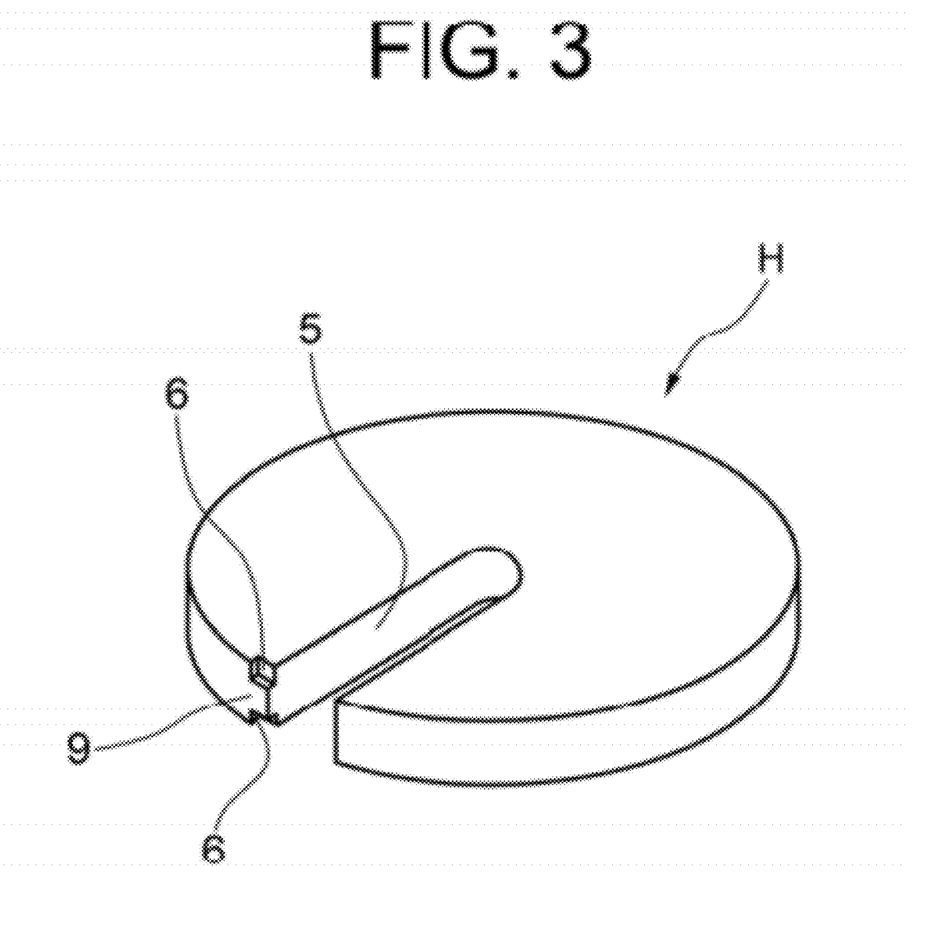
FIG. 3 is an illustration showing a configuration of a reel hub according to an exemplary embodiment of the invention.
Figure 4:
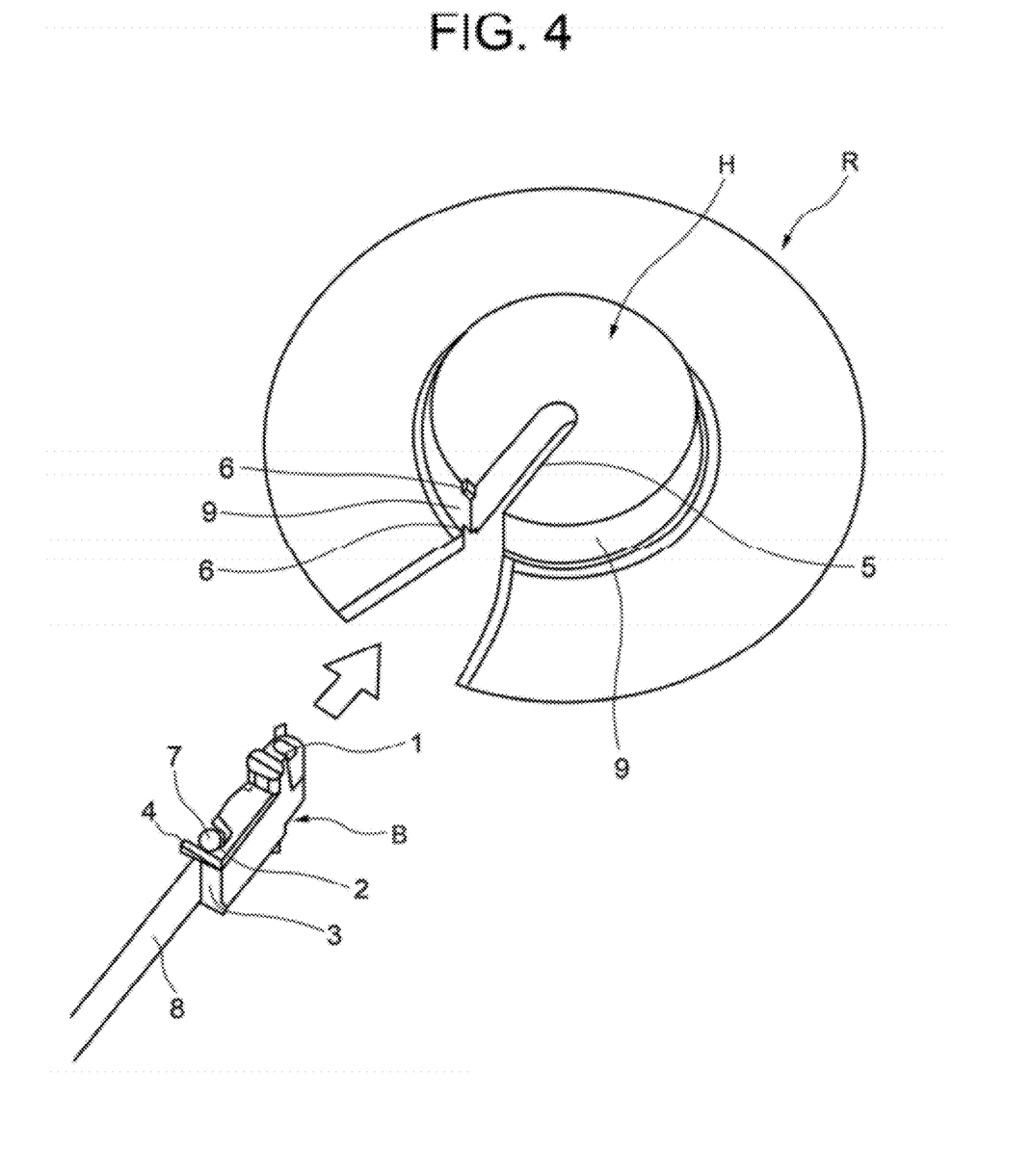
FIG. 4 is an illustration showing a state when the leader block is loaded in the reel hub.

A leader block B according to the exemplary embodiment is combined with a reel hub H shown in FIG. 3 to configure a reel R on which a tape as shown in FIG. 4 is wound. A slot 5 is formed in the reel hub H along the radial direction from the peripheral surface to the center part as shown in FIG. 3.

The leader block B has a shape suitable to be inserted into the slot 5 of the reel hub H shown in FIG. 3 from the radial direction of the reel hub H as shown in FIGS. 1A and 1B, and the leader block B includes: a supporting part 1 with which the leader block B is fitted with the slot 5 of the reel hub H; and a hook part 2 for holding a leader pin 7 to which a beginning of a tape 8 is being fixed. The supporting part 1 includes an operational hole 1a into which the pin is inserted when the leader block is carried. As shown in FIG. 4, the leader block is connected to the tape 8 with the leader pin 7 being detachably engaged in the hook part 2, and inserted in the slot 5 of the reel hub H from a tip end part of the supporting part 1, a circular-shaped tip end part of the supporting part 1 abuts a circular-shaped wall of the slot 5, and both side surfaces of the supporting part 1 abut the facing side walls of the slot 5 of the reel hub H. With this, the leader block is loaded into the slot 5 of the reel hub H so as to be held detachably, and the operational hole 1a of the supporting part 1 is brought to be positioned at a shaft center of the reel hub H. Note that, since a known structure can be applied for the supporting part 1 and hook part 2, a detailed explanation therefor is omitted.

The peripheral surface of the hook part 2 side of the leader block B forms a guide surface 3 which becomes a (continuous) part of a take-up surface 9 for winding the tape 8 formed on a peripheral surface of the reel hub H. Further, the leader block B includes protruding parts 4 to be supported by the reel hub H when the leader block B is loaded in the slot 5 of the reel hub H. In an example shown in FIG. 1, the protruding parts 4 are positioned at an open side of the hook part 2 and provided at upper and lower edges of the guide surface 3 (by being separated in a width direction of the tape take-up surface formed on the peripheral surface of the reel hub H). Also, the protruding parts 4 are provided so as to be protruded in a circumferential direction of the reel hub H. In the example shown in FIG. 1, the protruding parts 4 are formed to be protruded in the circumferential direction of the reel hub H and in a direction orthogonal to an insert direction to the reel hub H. Accordingly, the tape 8 extended from the lead pin 7 is wound by the take-up surface 9 of the reel hub H by passing through between the two protruding parts 4 being separated in the width direction of the take-up surface 9.

Further, a configuration of the reel hub according to the exemplary embodiment is shown in FIG. 3. The reel hub H includes a slot 5 in which the leader block B is loaded, and notches 6 with which the protruding parts 4 of the leader block B are fitted when the leader block B is loaded into the slot 5 at the opening edge of the slot 5. In an example shown in FIG. 3, the notches 6 are formed at a boundary between one of wall surfaces of the slot 5 (wall surface which is facing to the open side of the hook part of the leader block) and an outer peripheral surface. Here, the notches 6 are provided in such a manner as being separated from each other for a space greater than the width of the tape take-up surface 9 (vertical direction in FIG. 3), corresponding to the protruding parts 4 of the leader block B, thus an interference with the tape wound around the take-up surface 9 is prevented.

Here, the configuration is illustrated by omitting a flange for easier comprehension; however, it may be better to arrange the flange at the edge part of the hub as needed.

Figure 5:
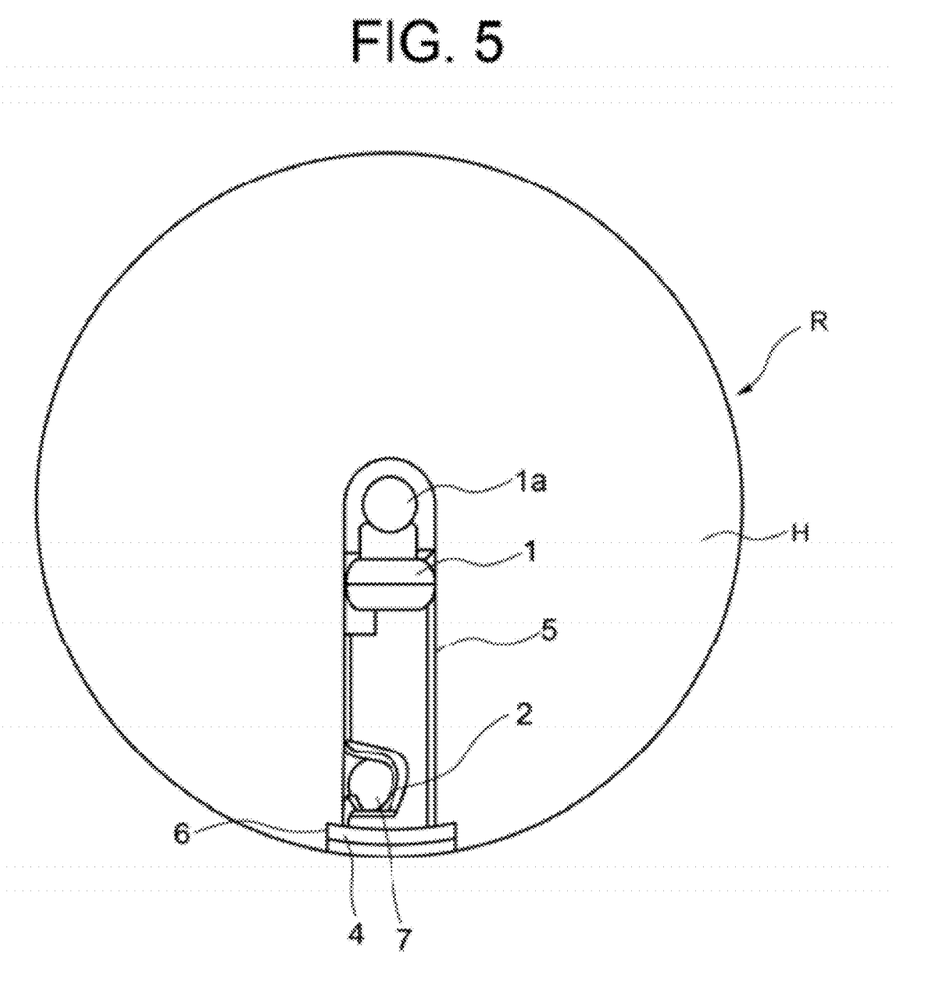
FIG. 5 is an illustration showing a configuration of a reel according to an exemplary embodiment of the invention.

FIG. 4 shows a state when the leader block B is loaded in the leader hub H. Also, FIG. 5 shows a configuration in which a reel R is set up with the leader block B being loaded in the reel hub H. When the leader block B is loaded in the reel hub H, the protruding parts 4 of the leader block B engage with the notches 6 of the reel hub H. At this time, the protruding parts 4 are in a state to be protruded in the circumference direction of the reel hub H, and an external force applied in the radial direction to push the leader block B into the slot 5 is received by an engagement of the protruding parts 4 and the notches 6. Consequently, if the leader block B is pressed by the tape wound around the reel, a level difference is not generated at the boundary between the reel hub H and the leader block B, that is, between the tape take-up surface 9 formed on the peripheral surface of the reel hub H and the guide surface 3 of the leader block B. With this, even when the reel is rotated at high speed, the non-uniform winding is not generated with the tape.

Note that, since the operational hole 1a of the supporting part 1 coincides with the shaft center of the reel hub H, the leader block B and the reel hub H are integrally rotatable without retracting the mechanism which carries the leader block B.

Figure 6:
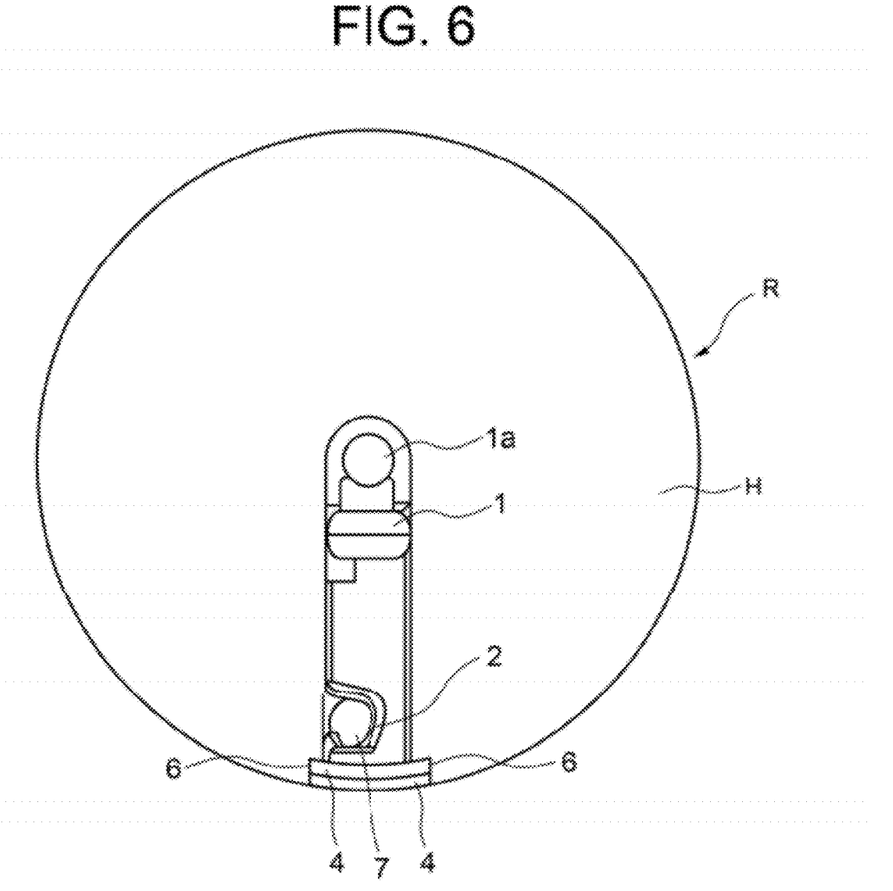
FIG. 6 is an illustration showing a state when a hook part on which protruding parts are formed on both sides is loaded in a reel hub to which notches are formed at both side walls of a slot.

In the above described example, the protruding parts 4 are formed only on the open side of the hook part 2; however, it is not limited to such case. As shown in FIG. 6, the protruding parts 4 may be formed so as to be protruded on the opposing side of the open side of the hook part 2 (i.e., non-open side) in the circumference direction of the reel hub H in addition to the open side of the hook part 2 of the leader block B shown in FIG. 1. In this case, the notches 6 are formed at the opening edge of the slot 5 of the reel hub H so as to be corresponded to the respective protruding parts 4 formed on both sides of the hook part 2 of the leader block B.

With this, by forming the protruding parts 4 on both sides of the hook part 2 so as to be supported with the respective protruding parts 4 by being fitted in the notches 6 of the reel hub H, the force applied to the open side of the hook part 2 can be received with the both side of the hook part 2 when the tape is wound around the take-up surface 9 of the reel hub H, and the strain to be generated on the open side of the hook part 2 can be prevented more surely.

As described above, according to the exemplary embodiment, since only the leader pin attached to the beginning of the tape is accommodated in the tape cartridge in which the tape is accommodated, and the leader block is not accommodated, the size of the tape cartridge can be reduced by the space to be occupied by the leader block.

Further, according to the exemplary embodiment, since the strain to be generated at the hook part of the leader block for engaging with the leader pin attached to the beginning of the tape can be prevented, a level difference is not generated between the tape take-up surface formed on the peripheral surface of the reel hub and the guide surface of the leader block, and the non-uniform winding is not generated with the tape which is wound by the reel.

Further, according to the exemplary embodiment, when the leader block is loaded into the slot of the reel hub in the radial direction of the reel hub, a hole used for carrying the leader block is matched with the shaft center position of the reel hub. Therefore, the reel hub can be rotated without retracting the carrier mechanism which carries the leader block to the reel hub by being inserted in the hole of the leader block, from the leader block. Also, since the reel hub can be rotated without retracting the carrier mechanism, reading/writing from/to the tape can be performed at the time when the leader block is loaded in the reel hub, and the time required until reading/writing can be shortened.

Still further, since the leader block is loaded into the reel hub in the radial direction of the reel hub, a proportion of the guide surface formed on the peripheral surface of the leader block to the tape take-up surface formed on the peripheral surface of reel hub is small. Specifically, it occupies about a width dimension of the slot of the reel hub into which the leader block is accepted, thus a high processing technique is not required to process the guide surface of the leader block.

Furthermore, according to the exemplary embodiment, the non-uniform winding to be generated when the tape is wound around the reel can be prevented without changing the configurations shown in FIG. 7 and FIG. 8 greatly, nor employing the complex configuration described in Patent Document 1.

As an exemplary advantage according to the invention, it is possible to provide a leader block, a reel hub, and a reel using the same, with which the cartridge for accommodating the tape can be downsized, a carrying mechanism is not required to be retracted after the leader block and the reel hub are fitted, and the generation of the non-uniform winding can be prevented.

Note that the exemplary embodiment described above is a preferred example of the present invention; however, the invention is not limited to the embodiment, and various changes in form and details may be made therein.

INDUSTRIAL APPLICABILITY

With the present invention, it is possible to achieve an effect by applying the invention for winding a recording medium such as a magnetic tape which is an external recording medium for a computer or the like.

What is claimed is:

1. A reel, formed by combining a leader block and a reel hub to load the leader block,
wherein the reel hub has a slot linear formed along a radial direction from a peripheral surface to a shaft center, and
wherein the leader block has a supporting part, and a hook part for holding a leader pin to which a beginning of a tape is being fixed, wherein
a circular-shaped tip end part of the supporting part abuts a circular-shaped wall of the slot, and both sides of surfaces of the supporting part abut facing side walls of the slot, so that the leader block can be loaded into the slot to be held detachably, and
when the leader block is held into the slot, an operational hole of the supporting part, into which a pin is inserted when the leader block is carried, is brought to be positioned at a shaft center of the reel hub, and wherein
the hook part includes:
a guide surface becoming a part of a take-up surface for winding the tape formed on a peripheral surface of the reel hub; and
protruding parts provided at the guide surface by being separated in a width direction of the tape take-up surface, the protruding parts protruding in a circumferential direction of the reel hub and in a direction orthogonal to an insert direction to the reel hub, thereby guiding the tape extended from the lead pin to the take-up surface of the tape, and
wherein the reel hub has notches with which the protruding parts of the leader block are fitted when the leader block is loaded into the slot at an opening edge of the slot, and wherein
the notches are formed at a boundary between a wall surface of the slot and an outer peripheral surface, being separated from each other for a space greater than the width of the tape take-up surface corresponding to the protruding parts of the leader block, whereby an interference with the tape wound around the take-up surface is prevented.

* * * * *